United States Patent [19]
Litzenberger

[11] Patent Number: 5,870,460
[45] Date of Patent: Feb. 9, 1999

[54] SYSTEM FOR LEAST COST ROUTING OF DATA TRANSACTIONS IN A TELECOMMUNICATIONS NETWORK

[75] Inventor: Paul D. Litzenberger, Wylie, Tex.

[73] Assignee: MCI Communications Corporation, Washington, D.C.

[21] Appl. No.: 876,249

[22] Filed: Jun. 16, 1997

Related U.S. Application Data

[63] Continuation of Ser. No. 455,220, May 31, 1995, abandoned.

[51] Int. Cl.$^6$ ............................ H04M 15/00; H04M 3/00
[52] U.S. Cl. .......................... 379/114; 379/111; 379/269; 379/272; 379/273
[58] Field of Search ........................... 379/111–116, 201, 379/207, 219, 220, 221, 269, 272, 273

[56] References Cited

U.S. PATENT DOCUMENTS

| | | | |
|---|---|---|---|
| 4,284,852 | 8/1981 | Szybicki | 379/221 |
| 4,594,477 | 6/1986 | Noirot | 379/224 |
| 4,756,019 | 7/1988 | Szybicki | 379/115 |
| 4,791,665 | 12/1988 | Bogart | 379/207 |
| 4,882,699 | 11/1989 | Evensen | 379/221 |
| 4,931,941 | 6/1990 | Krishnan | 379/220 |
| 4,972,464 | 11/1990 | Webb | 379/112 |
| 4,974,256 | 11/1990 | Cyr et al. | 379/113 |
| 5,163,042 | 11/1992 | Ochiai | 379/220 |
| 5,253,288 | 10/1993 | Frey | 379/201 |
| 5,311,572 | 5/1994 | Friedes | 379/220 |
| 5,425,086 | 6/1995 | Hidaka | 379/173 |
| 5,430,719 | 7/1995 | Weisser | 379/95 |
| 5,450,483 | 9/1995 | Williams | 379/112 |

*Primary Examiner*—Vijay Shankar

[57] ABSTRACT

A system allocates data links between a switch and a database for data transactions in a telecommunications network. The data links between the switch and the database carry the transaction data for providing routing, card verification, address translation information, etc. by the database. The Flexible Link Selection Algorithm provides for accessing the data links using the round-robin method, wherein each data link is accessed sequentially to transport the data to and from the database. Alternatively, the Flexible Link Selection Algorithm provides for accessing the data links using dynamic allocation based on the least cost routing between the switch and the database. In the latter mode, the switch uses the least "expensive" database, i.e., database having the least cost routing between the switch and the database, until the volume of data transactions in the data links associated with that database exceeds a predetermined threshold level. If the threshold level is exceeded, the next least "expensive" database is selected, and its data links are utilized used to carry the data transactions between the database and the switch.

4 Claims, 3 Drawing Sheets

SYSTEM FOR LEAST COST ROUTING OF DATA TRANSACTIONS IN A TELECOMMUNICATIONS NETWORK

This application is a continuation of U.S. patent application Ser. No. 08/455,220, filed May 31, 1995, abandoned.

FIELD OF THE INVENTION

This invention relates to a telecommunications network and, in particular, a telecommunications system for dynamically allocating data links between a switching office and a processing node in the telecommunications network of a long distance carrier.

BACKGROUND OF THE INVENTION

Originally in a telecommunications network, the switching office (hereinafter switch) made all decisions on call processing features, without any need for external information, such as a database. Data, associated with a telephone call, was common to many locations, and the storage capacity of disks or random access memory (RAM) in the switch was sufficient to handle the data. Eventually, however, technological advances, information expansion, and network complexity necessitated access to external resources for assisting the switch in the call processing decisions. Intelligent Platforms (IP), such as a remotely located database, evolved and began assisting in the decisions on call processing features on a significant amount of the network traffic.

Currently, data links connect the switch and the remote database via the well-known X.25 packet-switched communications protocol, as described in U.S. Pat. Nos. 5,095,505 and 5,335,268 which are of common assignee with the present invention. The disclosures of these patents are incorporated herein by reference. The data links, for example, permit data transfer in call routing, card verification, address translation information, etc. The current architectural configuration consists of a set of 19.2Kbits/sec point-to-point links between each switch and each database. Typically, several databases, holding identical information, are attached to a single switch for creating a robust network. In this multi-database configuration, failure of a database or a data link of the database will not prevent the switch from completing the calls, as the switch will request one of the remaining databases for assistance in call processing.

To balance the volume of data transactions among the databases, a round-robin link selection algorithm is currently used by the switch. This algorithm sequentially accesses each database connected to the switch, balancing traffic among them, as well as between the links to each database, to ensure that no single link is overloaded while other links are carrying little or no data traffic.

While the round-robin link selection algorithm has an advantage of distributing the data transactions among the databases equally, it fails to consider the cost of data routing to various databases. For example, if the call, requiring special processing by the database, is originating on the East Coast of the United States, it would be more cost efficient for the long distance carrier to access the database also located on the East Coast. If, however, the round-robin link selection algorithm is used by the switch, the call-related information might have to be routed to the database on the West Coast, if according to the algorithm, it is its turn to process the call. The response from the database would have to be returned to the East Coast for completing the call. This cross-country round trip results in inefficient and expensive call processing by the long distance carrier.

The benefit of balancing the traffic by the round-robin link selection algorithm might have outweighed the routing cost while the data traffic between the switch and the database was light. As the long distance carriers constantly strive to provide more enhanced intelligent networking technologies and services, projections show that the throughput requirements will grow much faster than the processing capabilities of the network. This growth is due to the increase in traffic volume, the types of calls requiring special processing, and the number of transactions per call. In view of this significant growth, the cumulative effect of cost effectively routing data transactions becomes an important factor in the business decisions of the long distance carriers.

Intensified by the increased number and volume of data transactions between the switch and the database, a need therefore exists for cost effectively allocating traffic, associated with a telephone call, among various databases that share information resources for the switch.

OBJECTS OF THE INVENTION

It is therefore an object of the invention to cost effectively allocate data transactions among multiple databases in a telecommunications network of the long distance carrier.

It is another object of the invention to cost effectively allocate data transactions without affecting the existing architecture of a telecommunications network.

It is yet another object of the invention to provide the capability to select the routing of data transactions on the basis of either cost efficiency or equal loading in a telecommunications network.

SUMMARY OF THE INVENTION

These and other objects, features and advantages are accomplished by the disclosed system.

In a telecommunications network of a long distance carrier, the disclosed system selects a routing for a data transaction associated with a telephone call. At least two databases provide call processing information, such as routing, card verification, address translation information, etc. for the telephone call. Each database includes an identical information necessary for the call processing.

In accordance with one embodiment of the invention, a remotely located switch is connected to each database via a pair of data links. After receiving the call processing information from either of the databases, the switch routes the telephone call to a destination as well known in the art.

Further in accordance with the invention, the processing means in the switch provides for Flexible Link Selection Algorithm (FLSA). According to the FLSA, the data links between the switch and the databases are used sequentially to carry the call processing information between the switch and the two databases. Alternatively, the FLSA provides for the least cost routing of the data transaction associated with the telephone call between the switch and either of the two databases based on a priority assigned to each database. The priority is based on the cost of routing between the switch and the databases which supply the information for the telephone call.

DESCRIPTION OF THE PREFERRED EMBODIMENTS

Figure 1:
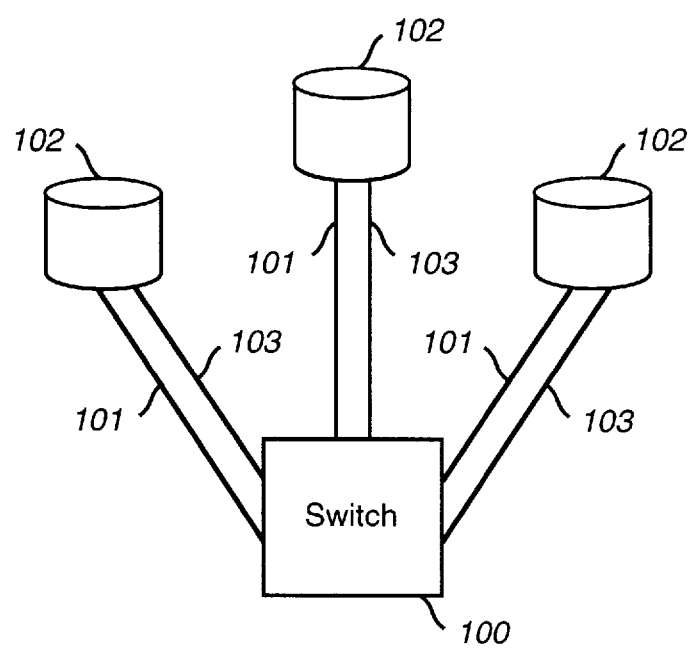
FIG. 1 is a block diagram for a basic configuration of a switch connected to multiple databases using two data links per database.

FIG. 1 shows the architectural configuration of a single switch 100 having two data links, 101 and 103, to each of three databases 102, 102" and 102Δ, for a total of six point-to-point links supported by the switch 100. Each database 102, 102" or 102Δ stores the same information as the other two and provides call processing information, such as routing, card verification, address translation information, etc. for the telephone call. The data links 101, 103, 101", 103", 101Δ and 103Δ may be fiber optic, coaxial, T-1 transmission lines, or of other type known in the art.

The processor in the switch 100 includes processing means for implementing a Flexible Link Selection Algorithm (FLSA) for data transactions associated with a telephone call requiring special processing. The FLSA provides for the selection of two link selection algorithms via a system level parameter. The first algorithm is a round-robin selection, currently used by the switch 100 and previously described herein. As stated above, the round-robin selection distributes workload across the data links 101, 103, 101", 103", 101Δ, and 103Δ evenly.

The other algorithm provided by the FLSA is a preferred hunt selection which enables the switch 100 to select a preferred database 102, 102", or 102Δ. Traffic will be balanced across two links serving the preferred database. Data traffic, however, will not be sent to any other database until the workload reaches predetermined, operator-selectable trigger points. The trigger points are system level parameters which represent the percentage of the volume of the unprocessed data messages, i.e., outstanding, and are based upon the available queue sizes.

Three system level parameters provide flexibility in the selection of links to transport transactions between the switch 100 and any of the databases 102, 102", or 102Δ. The FLSA is initiated by the first system level parameter. The second system level parameter determines when the next least-cost database must be chosen to share the traffic load with the first database. The third system level parameter is used to determine when it is necessary to override the flexible link selection and enforce round-robin link selection across all of the links to secure efficient real-time processing of the data transactions under heavy traffic. If the override feature is activated, traffic will be distributed equally, in the round-robin selection fashion, across all selected databases and links.

The first system level parameter is NCS_LINK_SELECTION_ALGORITHM which can take on the two values ROUND_ROBIN and DAP_HUNT, as shown in Table 1.

TABLE 1

| Parameter Name | Parameter Field |
| --- | --- |
| NCS_LINK_SELECTION_ALGORITHM | ROUND_ROBIN DAP_HUNT |

Selecting ROUND_ROBIN permits the same functionality as currently exists. Links are selected sequentially, and traffic is distributed evenly among all available links. If DAP_HUNT is activated, the switch 100 selects a preferred database 102, for example, to process the data transactions associated with the telephone calls. Thus, all data transactions associated with the telephone calls served by the switch 100 initially go to the preferred database 102. If the preferred database 102 is unavailable, for reasons of outage or congestion, the database having the next highest priority, for example, 102" is selected. The priority is assigned to each database connected to the switch 100 in accordance with the database table, which is explained below.

In the DAP_HUNT mode, traffic is distributed equally between the data links 101 and 103 for the preferred database 102. If the switch 100 uses additional databases 102" and 102Δ due to traffic levels, data links 101", 103", 101Δ and 103Δ from these databases, which actively transport transactions, are included into an available link pool. The links in that pool are accessed sequentially as explained below.

The second system level parameter NCS_LINK_LOADING_THRESHOLD has two fields LINK_UPPER_THRESHOLD and LINK_LOWER_THRESHOLD, as shown in Table 2.

TABLE 2

| Parameter Name | Parameter Field |
| --- | --- |
| NCS_LINK_LOADING_THRESHOLD | LINK_UPPER_THRESHOLD LINK_LOWER_THRESHOLD |

Each field, for example, can range from 1 to 100 shown in Table 3.

TABLE 3

| Parameter Field | Field Value |
| --- | --- |
| LINK_UPPER THRESHOLD | 1–100 |
| LINK_LOWER_THRESHOLD | 1–100 |

These parameter fields, measured in percentage points, represent the loading capacity of a queue associated with each data link 101, 103, etc. Thus, the value of the field LINK_UPPER_THRESHOLD governs the maximum loading of the data links on the active databases. Once the percentage of queue members, i.e., data transactions, on all the active links exceeds the LINK_UPPER_THRESHOLD value, then the available links to the database with the next highest priority are added to the selection. If the percentage of queue members on one of the active links falls below the LINK_LOWER_THRESHOLD value, then the data links associated with the most "expensive" database in the routing scheme will be eliminated from the round-robin selection by the switch 100. The most "expensive" database is the active database with the lowest priority in the routing scheme.

Generally, the processor in the switch 100 will monitor the values of the two fields and recommend via a message on a display that the LINK_LOWER_THRESHOLD be set, for example, 10–20 percentage points lower than the LINK_UPPER_THRESHOLD. Additionally, the processor ensures that the minimum difference between the LINK_UPPER_THRESHOLD value and the LINK_LOWER_THRESHOLD value is, for example, at least 10.

When a transaction needs to be sent to the database 102, the next sequential data link 101, for example, is selected. The percentage of queue members for the data link 101 is queried and compared to the LINK_UPPER_THRESHOLD value. If the percentage of queue members is below the threshold value, the transaction is sent via the selected link 101. If, however, the percentage of queue members exceeds the threshold value, the next link 103, for example, from the pool of available links is selected sequentially. If all available links within the current cost level have been queried and found to exceed the threshold value, then the available links to the next least-cost database 102Δ, for example, are added to the selection. The first available link 101Δ or 103Δ in the new set is then chosen to transmit the current data transaction.

After the requested data is returned to the switch 100 by the database 102 via the data link 101 or 103, the percentage of queue members is queried for the data link which was used for returning the data from the database. The percentage of queue members is then compared to the LINK_LOWER_THRESHOLD value. If the percentage of queue members is above the threshold value, the pool of available links remains the same, and the received transaction is processed normally. If the percentage of queue members on that link is below the minimum threshold value, then the links associated with the most "expensive" or highest-cost database route are removed from the selection algorithm, unless only a single database is being used.

NCS_SELECTION_OVERRIDE_THRESHOLD is the third system level parameter having two fields, as shown in Table 4.

TABLE 4

| Parameter Name | Parameter Field |
|---|---|
| NCS_SELECTION_OVERRIDE_THRESHOLD | OVERRIDE_UPPER_THRESHOLD |
| | OVERRIDE_LOWER_THRESHOLD |

Each field can range from 1 to 98, as shown in Table 5.

TABLE 5

| Field Name | Field Value |
|---|---|
| OVERRIDE_UPPER_THRESHOLD | 1–98 |
| OVERRIDE_LOWER_THRESHOLD | 1–98 |

These parameter fields, measured in percentage points, represent the loading of a queue associated with each data link 101, 103, etc. If the percentage of queue members, i.e., data transactions, in the queue exceeds the OVERRIDE_UPPER_THRESHOLD value while the NCS_LINK_SELECTION_ALGORITHM parameter is set to DAP_HUNT, then all available links revert to the round-robin selection method regardless of the route cost or priority. This override remains in effect until the volume in the queue falls below the value in the OVERRIDE_LOWER_THRESHOLD variable.

During the override, a MINOR alarm will be posted and a log printed indicating that this threshold has been violated. The processor in the switch 100 recommends via a message on a display that the OVERRIDE_LOWER_THRESHOLD be set, for example, 10–20 percentage points lower than the OVERRIDE_UPPER_THRESHOLD value. The processor also ensures that the minimum difference between the OVERRIDE_UPPER_THRESHOLD value and the OVERRIDE_LOWER_THRESHOLD value is, for example, at least 10.

Additionally, the processor recommends via a message on a display that the value of OVERRIDE_UPPER_THRESHOLD be set, for example, 2–5 percentage points lower than the value of LINK_UPPER_THRESHOLD to prevent the volume of data transactions in the data link from approaching the maximum capacity of the link. The processor also ensures that the minimum difference between the LINK_UPPER_THRESHOLD value and the OVERRIDE_UPPER_THRESHOLD value is at least 2.

Currently, each link 101 or 103, for example, is associated with the database 102, and when the link 101 or 103 is used for transmitting requests, the corresponding database 102 is easily determined.

After determining the identity of the database 102, the processor in the switch 100 accesses the database table NCSCOST. In the database table the cost, i.e., priority of routing, is assigned to each database. This database table is used to select the next database for the data traffic when the percentage of queue members in the links of the "preferred" database exceeds a specified value. One example of the priority table is shown below in Table 6.

TABLE 6

| DAP_ID | COST |
|---|---|
| 0 | 0 |
| 1 | 1 |
| 2 | 2 |

TABLE 6-continued

| DAP_ID | COST |
|---|---|
| 3 | 2 |
| . | . |
| . | . |
| . | . |
| 255 | 255 |

The first field DAP_ID includes the identification number for each supported database and can range from 0 to 255. The second field COST can range from 0–255 for a total of 256 priorities. The lowest value, zero (0) is the most preferred or least-cost database choice. The next preferred or least-cost database has the value of one (1), and so on. The COST field allows entry of the same value for more than one DAP_ID key field. When two or more databases have the same cost value, they are treated equally, and all links associated with the database are treated as one cost level.

For example, the database 102 has a cost of zero (0), and the database 102" and the database 102Δ have identical cost values of one (1). If the threshold for the loading of the database 102 has been exceeded, then all links associated with the database 102" and database 102Δ are added to the selection pool to be used in a sequential order. The two databases 102" and 102Δ are treated equally because of the identical cost value.

Figure 2:
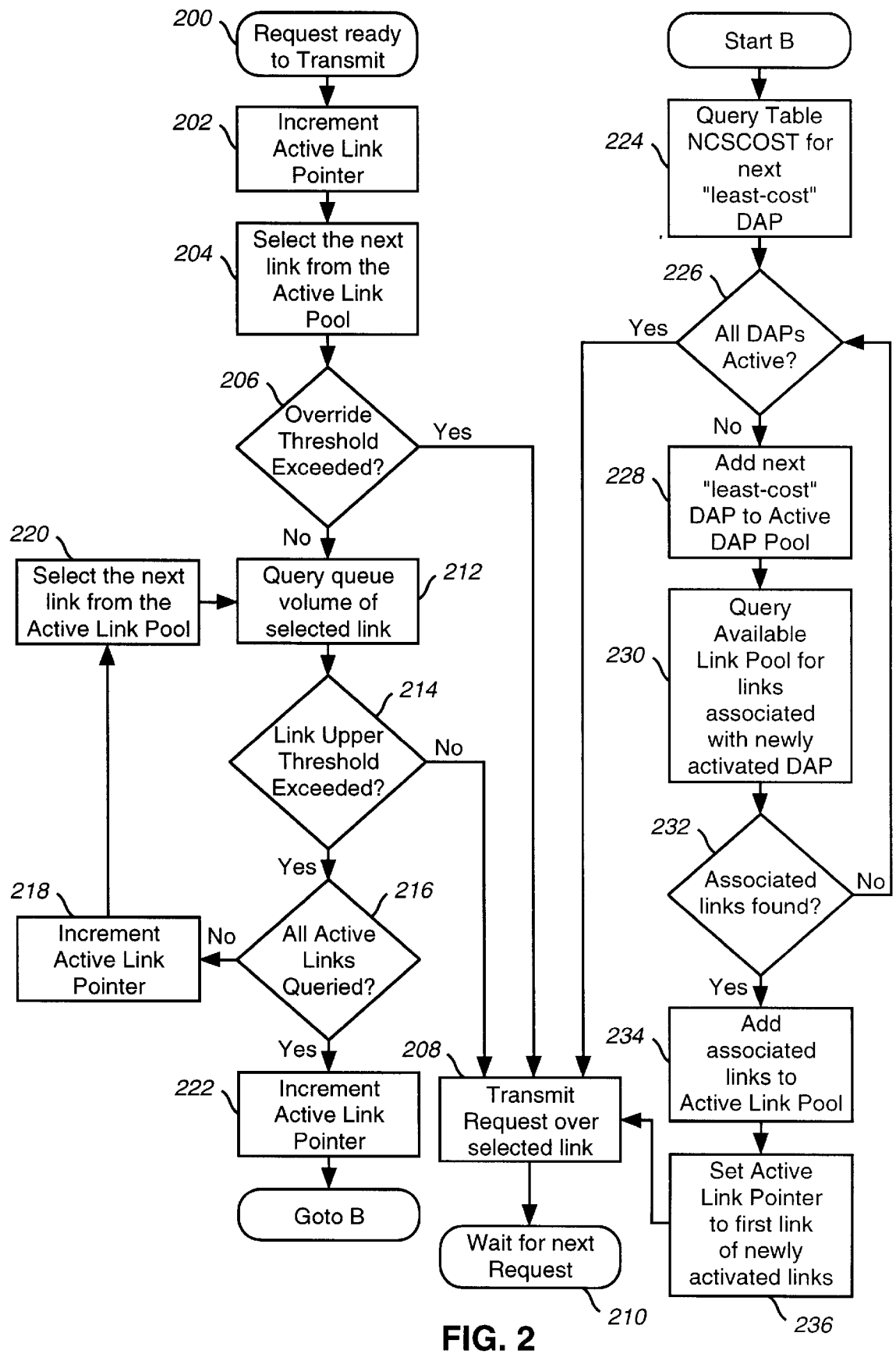
FIG. 2 is a flowchart for Flexible Link Selection Algorithm in the DAP_HUNT mode, when the active link pool is increased.

FIG. 2 is a flowchart for the FLSA in the DAP_HUNT mode, when the active link pool is incremented. In step 200, the switch 100 receives a telephone call requesting call processing information from the database 102. In step 202, the processor in the switch 100 increments a link pointer in the active link pool of the least-cost database. As stated above, the least-cost database may, for example, have two data links 101 and 103. The two data links 101 and 103 may, for example, comprise the active link pool, while the data links 101, 103, 101", 103", 101Δ and 103Δ comprise an available link pool. After incrementing, the link pointer points to the next link in the active pool, and that link is selected for transmitting the data transaction, as shown in step 204.

In step 206, the processor determines whether the value of OVERRIDE_UPPER_THRESHOLD has been exceeded for the selected data link. As stated above, if the percentage of queue members, i.e., data transactions, in the queue exceeds the OVERRIDE_UPPER_THRESHOLD value, then all available links revert to the round-robin selection method regardless of the route cost or priority as shown in step 208. The switch 100 then waits for the next data transaction request in step 210.

If the OVERRIDE_UPPER_THRESHOLD value is not exceeded, the percentage of queue members for that data link is queried in step 212 and compared to the LINK_UPPER_THRESHOLD value in step 214. If the percentage of queue members is below the threshold value, the transaction is sent via the selected link in step 208. If, however, the percentage of queue members exceeds the threshold value, a determination is made whether all available links within the current cost level have been queried and found to exceed the threshold value in step 216. If not all available links have been queried, then the link pointer in the active link pool of the least-cost database is incremented in step 218, and the next data link is selected in step 220. The steps 212, 214 and 216 are repeated for the current and subsequent data links until all data links in the active link pool have been queried.

If all available links within the current cost level have been queried and found to exceed the threshold value in step 216, the link pointer is incremented in step 222. The database table is accessed for the next "least-cost" database (step 224). One example of the database table was shown above in Table 6. A determination is made whether all databases 102, 102" and 102Δ connected to the switch 100 are currently active. If all databases 102, 102" and 102Δ are active, it means that the active link pool comprises all available data links 101, 103, 101", 103", 101Δ and 103Δ and is equal to the available link pool. If the link pool comprises all data links 101, 103, 101", 103", 101Δ and 103Δ, then the request is transmitted over the selected link in step 208.

If, however, not all databases are active, the next "least-cost" database, such as 102" or 102Δ is added according to the assigned priority for the databases as shown in step 228. The data links, 101" and 103", for example, associated with the newly added database 102" are queried in the available link pool in step 230. If the links are found in step 232, the data links 101" and 103" are added to the active link pool in step 234, and the link pointer is set to the first link of the newly activated data link in step 236. The data transaction is then transmitted via the newly activated data link in step 208. If the links are not found in the available link pool in step 232, the next "least-cost" database is selected from the database table, such as Table 6, in step 224, and the steps 226 through 232 are repeated if necessary.

Figure 3:
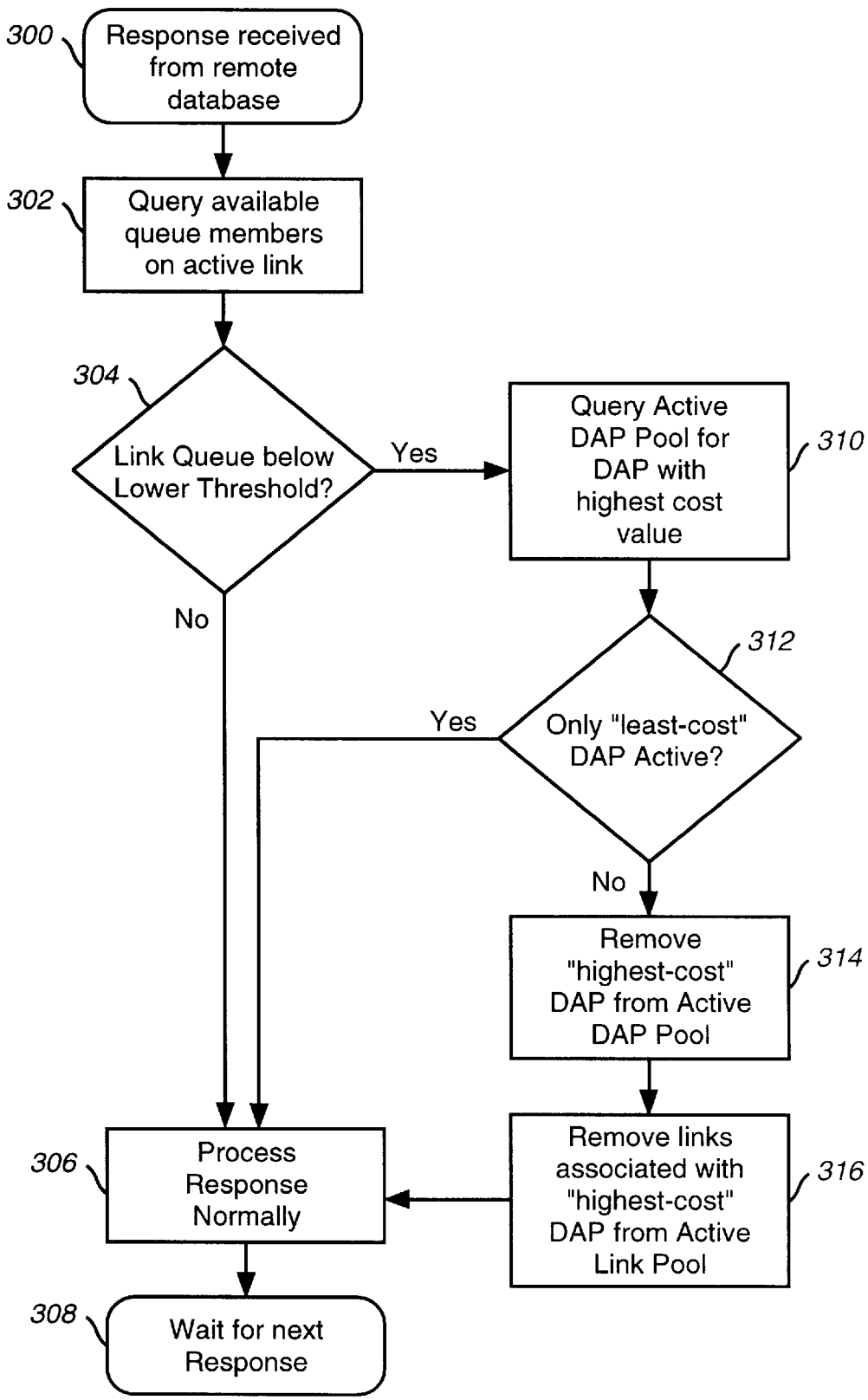
FIG. 3 is a flowchart for Flexible Link Selection Algorithm in the DAP_HUNT mode, when the active link pool is decreased.

FIG. 3 is a flowchart for the FLSA in the DAP_HUNT mode, when the active link pool is decremented. In step 300, the switch 100 receives a response from the database 102 after processing the call-related data. In step 302, the percentage of queue members is queried for the data link 101 which was used for returning the data from the database 102. The percentage of queue members is then compared to the LINK_LOWER_THRESHOLD value in step 304. If the percentage of queue members is above the threshold value, the pool of active links remains the same, and the received transaction is processed normally in step 306. In step 308, the switch 100 waits for the next response from the database 102.

If the percentage of queue members on the link 101 is below the minimum threshold value in step 304, then the query is made for the highest cost or the most "expensive" database in step 310. After determining that the least-cost database 102 is the only one active in step 312, the active link pool is unchanged, and the received transaction is processed in step 306. If, however, the active database is not the least-cost database, it is removed from the list of active databases in step 314, and the data links associated with this database are removed from the active link pool in step 316. The transaction is then processed in step 306 as previously stated.

Although the specific embodiments were described with reference to a single data transfer rate between the switch 100 and the databases 102, 102" and 102Δ, other data transfer rates may be equally employed by the disclosed invention. In addition, even though the description of the preferred embodiment of the FLSA included an initial selection between the round-robin mode and the least cost database hunt mode, it is understood that another embodiment of the disclosed invention may eliminate the selection and provide only the least cost database hunt mode.

In another embodiment of the invention, one or several databases 102, 102" or 102Δ may not be remotely located from the switch 100. Instead, the database 102, for example, may be co-located with the switch 100, while other databases 102" and 102Δ are remotely located.

Since those skilled in the art can modify the disclosed specific embodiment without departing from the spirit of the invention, it is, therefore, intended that the claims be interpreted to cover such modifications and equivalents.

What is claimed is:

1. A telecommunications system for selecting the least cost routing of a database transaction, comprising:

at least two intelligent platform means for providing information associated with the transaction, wherein each intelligent platform means includes substantially identical information required for processing the transaction;

each intelligent platform means having first ends of at least two data links connected thereto for selectively carrying information associated with the transaction; and a switch, communicatively coupled with the intelligent platform means via second connected ends of the data links for routing a telephone call through a network excluding the platform means, based on a result of the transaction, wherein the switch includes processing means for selecting a data link to an intelligent platform means based on a least cost of routing the database transaction between the switch and the intelligent platform means, the processing means further determining transaction traffic along each of the data links associated with a first selected platform means involving least cost routing, and (a) if the transaction traffic with the first platform means is below a preselected threshold on each data link of the selected platform means, selectively alternating data links for carrying transactions;

(b) if the transaction traffic on one of the data links of the first platform means is above the preselected threshold, selectively switching transactions to the other data link, for as long as the threshold thereon is not exceeded; and (c) if the transaction traffic on both of the data links of the first platform means is above the preselected threshold, selectively switching transactions to the data links associated with a second intelligent platform means.

2. The telecommunications system according to claim 1, wherein the processing means re-enables switched transaction communication back to the first intelligent platform means when the transaction traffic on one of the data links associated therewith falls below the preselected threshold.

3. A telecommunications method for selecting the least cost routing of a database transaction, comprising the steps:

providing information associated with the transaction from, at least two intelligent platforms, substantially identical information required for processing the transaction being stored at each intelligent platform;

providing at least two data links to each intelligent platform for selectively carrying information associated with the transaction; and communicatively coupling a switch with the intelligent platforms via the data links for routing a telephone call through a network excluding the platforms, based on a result of the transaction;

selecting a data link to an intelligent platform based on a least cost of routing the database transaction between the switch and the intelligent platforms;

determining transaction traffic along each of the data links associated with a first selected platform involving least cost routing, and (a) if the transaction traffic with the first platform is below a preselected threshold on each data link of the selected platform, selectively alternating data links for carrying transactions;

(b) if the transaction traffic on one of the data links of the first platform is above the preselected threshold, selectively switching transactions to the other data link, for as long as the threshold thereon is not exceeded; and (c) if the transaction traffic on both of the data links of the first platform is above the preselected threshold, selectively switching transactions to the data links associated with a second intelligent platform.

4. The telecommunications method according to claim 3, further comprising the step of re-enabling switching transaction communication back to the first intelligent platform when the transaction traffic on one of the data links associated therewith falls below the preselected threshold.

* * * * *